Patented Mar. 16, 1948

2,437,962

UNITED STATES PATENT OFFICE 2,437,962

COPOLYMERS OF ALLYL ESTERS OF POLYBASIC ACID WITH SATURATED MONOHYDRIC ALCOHOL ESTERS OF UNSATURATED POLYCARBOXYLIC ACID

Edward L. Kropa, Old Greenwich, Conn., assignor to American Cyanamid Company, New York, N. Y., a corporation of Maine No Drawing. Application August 17, 1943, Serial No. 498,980

10 Claims. (Cl. 260—78.5)

This invention relates to clear colorless resins which are cured to the stage where they are substantially infusible and insoluble.

An object of this invention is to prepare clear colorless resins which are substantially infusible and substantially insoluble.

Another object of my invention is to cause esters, which ordinarily polymerize slowly alone, to copolymerize rapidly when mixed.

These and other objects are attained by copolymerizing an ester of an allyl alcohol (substituted or unsubstituted) and a polybasic acid, preferably a saturated polybasic acid (organic or inorganic), with an ester of an alpha, beta-unsaturated polycarboxylic acid and of a saturated monohydric alcohol. More specifically, my invention is concerned with the copolymerization of the polyallyl esters of polybasic acids with the alkyl esters of fumaric acid, citraconic acid and maleic acid. It is also desirable to react the two esters in about molecularly equivalent proportions based upon the unsaturation content of each ester.

The following examples in which the proportions are given in parts by weight are given by way of illustration and not in limitation:

Example 1

| | Parts |
|---|---|
| Diallyl succinate | 365 |
| Diethyl fumarate | 635 |
| Benzoyl peroxide | 5 |

These substances are heated together at a temperature of about 90° C. after about 20 minutes the mixture was still liquid while after about 25 minutes the liquid gelled and after about 3 hours the gel became very hard, transparent, infusible and insoluble.

Example 2

| | Parts |
|---|---|
| Diallyl sebacate | 82 |
| Diethyl fumarate | 100 |
| Benzoyl peroxide | 0.4 |

This composition is heated at about 90° C. thereby causing the liquid to gel after about 45 minutes and form a transparent insoluble gel after about 4 hours. This gel is somewhat softer than that formed in accordance with Example 1.

Example 3

| | Parts |
|---|---|
| Diallyl succinate | 365 |
| Diethyl fumarate | 635 |
| Benzoyl peroxide | 5 |

A solution of the diethyl fumarate and diallyl succinate is heated under an atmosphere of carbon dioxide or other inert gas at a temperature of 135–140° C. for approximately 2 hours. During this time the viscosity increases to about twice of that of the original solution when measured at 125–140° C. When the reaction mixture is cooled to room temperature a measurement of the viscosity indicates a 5–7 fold increase in viscosity.

The benzoyl peroxide is added to the solution which may then be cast at a temperature of about 75° C. to yield clear, infusible, insoluble resinous castings or the solution may be used for adhesive purposes, low pressure molding, as a curing composition, etc.

Example 4

A solution prepared in the manner described in Example 3 for casting is mixed with about an equal part of gasoline or similar solvent thereby causing the resin to coagulate and precipitate. The precipitated resin is dried thereby producing a molding composition which may be molded at about 150–2000 lbs./sq. in. and at a temperature of about 130° C. for about 20 minutes. A molding which is insoluble in acetone and which is transparent and water-white is obtained.

Example 5

A solution prepared in accordance with Example 3 is applied to a closely woven cotton cloth in a suitable manner. Several plies of the coated cloth are stacked between plates and the assembly cured for about 6 hours at around 100° C. A stiff laminated material is obtained. In place of the cotton cloth, glass cloth may be substituted to yield desirable products.

Example 6

| | Parts |
|---|---|
| Diethyl chloromaleate | 676 |
| Diallyl succinate | 324 |
| Benzoyl peroxide | 3 |

These substances are copolymerized by heating at about 85° C. for from a few hours to several days. After 3 days a relatively soft reaction product is obtained. Gellation takes place slowly during that period of time.

Example 7

| | Parts |
|---|---|
| Diallyl phthalate | 460 |
| Dimethyl maleate | 540 |
| Benzoyl peroxide | 3 |

This composition is heated at about 85° C., thereby producing a transparent gel which is somewhat soft but harder than that produced according to Example 5.

Example 8

| | Parts |
|---|---|
| Dimethyl maleate | 593 |
| Diallyl succinate | 407 |
| Benzoyl peroxide | 3 |

These substances are heated together at about 85° C. and after about 3 days a transparent gel similar to that produced in accordance with Example 6 is obtained.

Example 9

| | Parts |
|---|---|
| Diethyl fumarate | 583 |
| Diallyl phthalate | 417 |
| Benzoyl peroxide | 3 |

This composition is heated at about 85° C. to produce a transparent gel, after about 3 days, which is quite hard.

Example 10

| | Parts |
|---|---|
| Diallyl maleate | 533 |
| Diethyl fumarate | 467 |
| Benzoyl peroxide | 5 |

These substances are heated together at about 90° C., the composition remaining liquid for about 20 minutes, gelling after about 35 minutes and forming a somewhat soft transparent gel after about 3 hours.

Example 11

| | Parts |
|---|---|
| Diethyl fumarate | 354 |
| Diethyl carbonate | 146 |
| Benzoyl peroxide | 0.5 |

These substances are mixed to form a homogeneous composition and then heated in a suitable mold at about 65° C. for about 5 days. A clear, colorless, insoluble casting is obtained. The surface hardness of the casting may be increased by heating the casting for an additional hour at about 200° C., preferably by means of a heat transfer medium such as glycerol. No discoloration occurs during such heating operations.

Example 12

Glass cloth is impregnated with prebodied resin prepared in accordance with Example 3. A two-ply laminate is heated for about 8 hours at 100° C. in the absence of air without any substantial applied pressure, i. e., substantially at atmospheric pressure. The product showed a tensile strength in one direction of 36,600 pounds per square inch and at right angles to this direction, 25,400 pounds per square inch. This difference is apparently due to the weave of the cloth. The modulus in bending, when tested similarly, was about $8.5 \times 10^5$ pounds per square inch in one direction and about $8.6 \times 10^5$ pounds per square inch in the other direction. The water absorption of the laminate at room temperature is only about 1.2% during a 24 hour period.

Example 13

Approximately 250 parts of diallyl maleate were heated in a bath. The temperature of the bath as well as the solution were recorded.

| Total Time elapsed, Minutes | Temperature Diallyl maleate, °C. | Temperature Bath, °C. |
|---|---|---|
| 0 | 65 | 162 |
| 3 | 118 | 143 |
| 10 | 142 | 143 |
| 15 | 156 | 152 |
| 30 | 104 | 152 |
| 43 | 143 | 148 |
| 45 | 163 | 148 |

As soon as the exothermic reaction was approached the material was removed from further contact with heat for approximately fifteen minutes and then further heated. The mass was then allowed to stand at room temperature and then distilled in vacuo. Approximately 60 parts of colorless viscous resin was obtained after the monomeric diallyl maleate had been removed.

2 parts of the resinous diallyl maleate were dissolved in 1 part of ethyl fumarate and treated with 0.2% of benzoyl peroxide. In approximately ten minutes at 90° C. a cloudy hard resin resulted.

Other resinous substances containing a plurality of unsaturated groups such as allyl cellulose, methallyl cellulose, crotyl cellulose, etc. could be treated in a similar manner with reactive esters such as the polyalkyl esters of the $\alpha,\beta$ unsaturated dicarboxylic acids.

The allyl esters which are suitable for use in accordance with my invention are those esters of any allyl alcohol (substituted or unsubstituted) with a polybasic acid, preferably a saturated polybasic acid. Examples of such esters are diallyl carbonate, diallyl malonate, diallyl oxalate, diallyl succinate, diallyl gluconate, diallyl methylgluconate, diallyl adipate, the diallyl ester of azelaic acid, diallyl sebacate, diallyl tartronate, diallyl ester of endomethylene tetrahydrophthalic anhydride, triallyl tricarballylate, triallyl citrate, triallyl phosphate, triallyl silicone, the diallyl ester of ethylene glycol dicarbonate (i. e.,

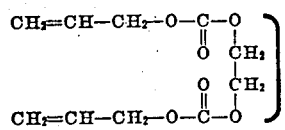

the diallyl ester of ethylene glycol dimalonate, the diallyl ester of ethylene glycol dioxalate, the diallyl ester of diethylene glycol dicarbonate, the diallyl ester of diethylene glycol dimalonate, the diallyl ester of diethylene glycol dioxalate, the diallyl ester of carbonic acid or other dicarboxylic acid diesters of other glycols, e. g., propylene glycol, the butylene glycols, triethylene glycol, etc., tetraallyl silicate and other tetraallyl esters Tetraallyl compounds are not easily prepared by direct esterification. One way for preparing such compounds is by the use of the acid chlorides.

Other allyl compounds which may be used for reaction with a polymerizable polyester of an alpha, beta unsaturated polycarboxylic acid include reaction products of allyl malonate with formaldehyde or glyoxal, such compounds having the following formula respectively:

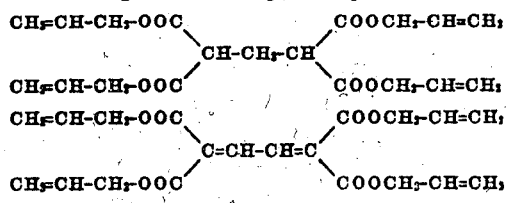

Another compound which may be employed is the tetraallyl ester obtained by the reaction of allyl malonate with chloroform in the presence of sodium allylate and which has the following formula:

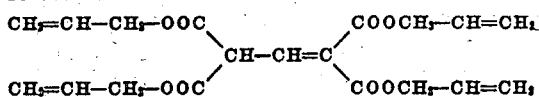

Still another compound which may be employed is the compound having the following formula:

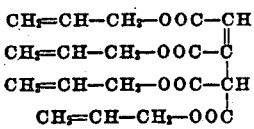

and it may be prepared by reacting allyl acetylene dicarboxylate with allyl malonate.

While the allyl esters of saturated polybasic acids are preferred, it may be desirable to use allyl esters of unsaturated polybasic acids in some cases, particularly in admixture with the polyallyl esters of the saturated polybasic acids. Examples of such esters of unsaturated acids are diallyl maleate, diallyl fumarate, diallyl itaconate, triallyl aconitate, diallyl mesaconate, diallyl citraconate, etc.

Homologs of allyl alcohol may be used in place of allyl alcohol, e. g., alkyl substituted allyl alcohols such as methallyl alcohol, ethallyl alcohol, the chlorallyl alcohols including 2-chlorallyl alcohol, etc. Accordingly, other examples of polyallyl esters suitable for use in accordance with my invention are obtained by substituting the homologs of allyl alcohol for the allyl alcohol in the various esters mentioned in the preceding paragraphs.

Mixed esters may be employed if desired. Thus, for example, a polybasic acid may be esterified with a mixture of allyl alcohols or in some cases with a mixture of an allyl alcohol and a saturated monohydric alcohol. For example, it may be desirable to employ a monoalkyl diallyl tricarballylate such as monomethyl- or monoethyl-diallyl tricarballylate. Mixtures of the various allyl esters may also be utilized in accordance with my invention.

Hard, clear and homogeneous products are generally obtained by reacting the allyl esters with the ester of an alpha, beta unsaturated dicarboxylic acid and a monohydric alcohol in molecular equivalent proportions based upon the unsaturated content of each ester. In other words, one mol of a diallyl ester would be reacted with two mols of a dialkyl ester of maleic or fumaric acid. On the other hand, one mol of a triallyl ester would be reacted with about three mols of a dialkyl ester of maleic or fumaric acid. If the polyallyl ester contains unsaturation, then the proportions would be suitably modified. Thus, for example, one mol of diallyl maleate would be reacted with three mols of diethyl fumarate. While the preferred proportions are as stated above, nevertheless for some purposes, very different proportions may be used. Accordingly, my invention covers the use of substantial proportions of each of the esters which are copolymerized. By substantial proportions, I mean that each substance is present in an amount of at least 5%.

Any of the alkyl esters of alpha, beta unsaturated dicarboxylic acids are suitable for use in accordance with my invention. Examples of such esters are dimethyl maleate, diethyl fumarate, diethyl maleate, diethyl chlormaleate, diisopropyl fumarate, di-n-propyl maleate, diethyl itaconate, diethyl mesaconate, diethyl citraconate, triethyl aconitate, dibutyl maleate, dibutyl fumarate, the diamyl maleate and fumarates, the dihexyl and dicyclohexyl esters of fumaric and maleic acids, the di-dodecyl esters of maleic and fumaric acids, etc. Dimethyl fumarate may be used if desired, but has the disadvantage of being a solid of rather high melting point and therefore it is not easily handled.

Here again, mixed esters may be employed if desired. For example, monomethyl monoethyl fumarate, monomethyl mono-n-propyl fumarate, etc., may be used as well as any other ester of an alpha, beta unsaturated dicarboxylic acid with a mixture of saturated monohydric alcohols. Furthermore, mixtures of the various polyalkyl esters of alpha, beta unsaturated dicarboxylic acids may be employed in accordance with my invention.

If esters containing more than two ethylenic double bonds be employed, it is desirable that such esters be bodied or partially polymerized by heat treatment before copolymerization with a polyalkyl ester of an alpha, beta unsaturated polycarboxylic acid. This is illustrated by the procedure set forth in Example 13. The esters containing more than two ethylenic double bonds polymerize readily when heat-bodied, whereas those esters containing no more than two double bonds heat-body very slowly. The heat-bodied esters containing more than two double bonds copolymerize more rapidly with the polyesters of alpha, beta unsaturated polycarboxylic acids than the same esters which are not prebodied by heating.

The copolymerization of the esters in accordance with my invention is preferably carried out in the absence of air. This is conveniently done by treating the mixture of esters to be copolymerized in an inert atmosphere of carbon dioxide or nitrogen. In some instances it may be desirable to carry out the process at pressures above or below atmospheric pressure, but one of the advantages of my invention is that the polymerization may be carried out substantially at atmospheric pressure without the application of any considerable pressure in excess of atmospheric pressure. This enables one to produce very large sheets of laminated or molded materials without the use of expensive presses and it also enables one to produce laminated materials by continuous methods.

The copolymerization of unsaturated esters in accordance with my invention is preferably carried out in the presence of a suitable polymerization catalyst. Examples of these are the acidic peroxides (e. g., benzoyl peroxide, phthalic peroxide, succinic peroxide and benzoyl acetic peroxide), the fatty oil acid peroxides (e. g., the coconut oil acid peroxide, lauric peroxide, stearic peroxide and maleic peroxide), the alkyl peroxides, e. g., tertiary butyl peroxide and the terpene peroxides, e. g., ascaridole. Still other polymerization catalysts which might be used in some instances are the soluble cobalt salts (particularly the linoleate and napththenate), the aromatic sulfonic acids such as p-toluene sulfonic acid, aluminum chloride, stannic chloride and boron trifluoride.

The concentration of catalysts employed is usually small, i. e., for the preferred catalysts from about 1 part catalyst per 1000 parts of the polymerizable mixture to about 2 parts per 100 parts of the polymerizable mixture. If a polymerization inhibitor be present, up to 5 per cent or even more of catalyst may be necessary according to the concentration of the inhibitor.

The copolymerization of the mixture of esters in accordance with my invention is generally effected by heat. However, other polymerization conditions such as light, especially ultraviolet light, with or without heat, may be employed. The polymerization may be carried out at temperatures ranging from about 20° C. up to about 150° C. The preferred temperature range varies between about 50° C. and 100° C. If temperatures above the boiling point of one or more of the esters to be copolymerized be used, it is desirable or necessary to carry out the polymerization under pressure depending upon the boiling point of the ester or esters as compared to the polymerization temperature.

In some instances it may be desirable to incorporate a polymerization inhibitor, e. g., phenolic compounds, amines, aldehydes, etc. including hydroquinone, benzaldehyde, resorcinol, tannin, formaldehyde, symmetrical $\alpha,\beta$ naphthyl p-phenylene diamine, ascorbic acid, iso-ascorbic acid, etc. in an amount equivalent to about 0.1–1 percent in the mixture of esters to be copolymerized. This may be done prior to, during or after prebodying and its purpose may be either to stabilize the polymerizable mixture during storage or to control the rate of polymerization.

The polymerizable mixtures of esters may be partially polymerized or bodied by heating a mixture thereof at a temperature of about 70–150° C. for sufficient time to substantially reduce the induction period. While the time will vary with each combination of ester, with the initial viscosity and other such factors, it may be determined by observation of the rise in viscosity. In general the heating should be continued until the viscosity begins to rise rapidly. The general rule for determining the heating time is to heat the mixture until the viscosity is about two or three times the initial viscosity.

My polymerizable combinations of esters may be mixed with one or more fillers, e. g., wood flour, paper pulp, clay, glass filaments, mica, cotton flock, abrasives (such as silicon carbide), silica, asbestos, etc. Furthermore, desirable pigments or dyes may be included. In some instances molding compositions or laminated articles may be prepared by employing a filler in fabricated form, i. e., in the form of felt, paper, batts, cloth, etc. The fibers of such fabricated filler may be cotton or other cellulosic fibers, cellulose acetate, viscose, asbestos, glass, polyamide ("nylon"), polymerized vinylidine chloride ("Saran") etc. or mixtures thereof.

My resins may be admixed with other materials including various resins, e. g., shellac, cellulose esters and ethers, phenolic resins, alkyd resins, ester gum, melamine-formaldehyde resins, urea-formaldehyde resins, natural and synthetic rubber and polymers of unsaturated materials other than those which form the subject of this invention.

The present invention has many advantages over the prior art. Among these, one of the most important is that I am able to produce water-white materials since the ingredients of my polymerizable compositions may be purified by distillation and/or by chemical treatment prior to polymerization. Each of the ingredients of my compositions may be polymerized separately but such polymerizations proceed very slowly and completely insoluble products are not always obtained. By copolymerizing the two relatively slow polymerizing materials which I employ in accordance with my invention, I have been able to obtain rapid polymerization and insoluble products.

The term "insoluble" as applied to my polymeric materials means insoluble in the common organic solvents such as gasoline and other hydrocarbons, ethanol and other alcohols, acetone and other ketones. My resins are, of course, water-insoluble.

My polymerizable compositions are particularly suitable for the production of castings but they also find application in the production of articles molded under low or high pressure and either with or without filler. My polymerizable compositions are also useful in laminating paper and cloth as well as adhesives in the production of plywood, safety glass and the like. Other uses of my polymerizable compositions include the treatment of textiles, paper and other fibrous material such as leather to produce finishes thereon, to increase the strength thereof, to provide water and chemical resistance, or to assist in the production of ornamental effects such as those produced in textile printing. For any of these applications where it is desirable, my polymerizable mixture of esters may be used in the form of an emulsion. This emulsion may be prepared by polymerizing a mixture of the monomeric esters while emulsified in water or by emulsifying a partially polymerized mixture of the esters or in any other desired manner.

My compositions may also be employed in coating compositions alone or admixed with other film-forming materials and with or without solvents. An important advantage in the use of my compositions as coating materials is that no solvent is necessary for most applications and hence my polymerizable ester mixtures may be considered to be members of the group of the so-called solvent-less varnishes.

This application is a continuation-in-part of my copending application S. N. 248,536, filed December 30, 1938, now abandoned.

Obviously many modifications and variations may be made without departing from the spirit and scope of the invention as defined in the appended claims.

I claim:
1. A clear colorless resin which is a copolymer of a composition comprising as its sole polymerizable component a mixture of copolymerizable esters consisting of (1) a polyester of allyl alcohol with a polybasic acid and (2) a polyester of a saturated monohydric alcohol and an alpha, beta-unsaturated polycarboxylic acid, said mixture containing at least 5% of each polyester.

2. A resin which is a copolymer of a composition comprising as its sole polymerizable component a mixture of copolymerizable esters consisting of (1) a polyester of allyl alcohol with a saturated polybasic acid and (2) a polyester of a saturated monohydric alcohol with an alpha,beta-unsaturated dicarboxylic acid, said mixture containing at least 5% of each polyester.

3. A clear insoluble resin which is a copolymer of a composition comprising as its sole polymerizable component a mixture of copolymerizable esters consisting of (1) an ester of allyl alcohol with a saturated dicarboxylic acid and (2) a polyester of ethyl alcohol and an alpha,beta-unsaturated dicarboxylic acid, said mixture containing at least 5% of each polyester.

4. A clear colorless insoluble resin which is a copolymer of a composition comprising as its sole copolymerizable component a mixture of copolymerizable esters consisting of (1) diallyl phthalate and (2) diethyl fumarate, said mixture containing at least 5% each of diallyl phthalate and diethyl fumarate.

5. A process of producing clear insoluble resins which comprises copolymerizing a composition comprising as its sole polymerizable component a homogeneous mixture of copolymerizable esters consisting of (1) a polyester of allyl alcohol with a polybasic acid, (2) a polyester of a saturated monohydric alcohol with an alpha,beta-unsaturated polycarboxylic acid, and (3) a catalyst for the copolymerization of (1) and (2), said homogeneous mixture containing at least 5% of each polyester.

6. A process of producing clear insoluble resins which comprises copolymerizing a composition comprising as its sole polymerizable component a homogeneous mixture of copolymerizable esters consisting of (1) a polyester of allyl alcohol with a saturated polybasic acid, (2) a polyester of a saturated monohydric alcohol with an alpha,beta-unsaturated dicarboxylic acid, and (3) a catalyst for the copolymerization of (1) and (2), said homogeneous mixture containing at least 5% of each polyester.

7. A process of producing clear insoluble resins which comprises copolymerizing a composition comprising as its sole polymerizable component a homogeneous mixture of copolymerizable esters consisting of (1) a polyester of allyl alcohol with a saturated dicarboxylic acid, (2) a polyester of ethyl alcohol and an alpha,beta-unsaturated dicarboxylic acid, and (3) a catalyst for the copolymerization of (1) and (2), said homogeneous mixture containing at least 5% of each polyester.

8. A process of producing clear insoluble resins which comprises copolymerizing a composition comprising as its sole polymerizable component a homogeneous mixture of copolymerizable esters consisting of (1) diallyl phthalate, (2) diethyl fumarate, and (3) a catalyst for the copolymerization of (1) and (2), said homogeneous mixture containing at least 5% each of diallyl phthalate and diethyl fumarate.

9. A polymerizable composition comprising as its sole polymerizable component a mixture of copolymerizable esters consisting of (1) a polyester of allyl alcohol with a polybasic acid, (2) a polyester of a saturated monohydric alcohol and an alpha,beta-unsaturated dicarboxylic acid, and (3) a polymerization catalyst for accelerating the copolymerization of (1) and (2), said mixture containing at least 5% of each polyester.

10. A polymerizable composition comprising as its sole polymerizable component a mixture of copolymerizable esters consisting of (1) a polyester of allyl alcohol with a polybasic acid and (2) a polyester of a saturated monohydric alcohol and an alpha,beta-unsaturated dicarboxylic acid, said mixture containing at least 5% of each polyester.

EDWARD L. KROPA.

REFERENCES CITED

The following references are of record in the file of this patent:

UNITED STATES PATENTS

| Number | Name | Date |
| --- | --- | --- |
| 1,945,307 | Dykstra | Jan. 30, 1934 |
| 2,155,590 | Garvey | Apr. 25, 1939 |
| 2,182,316 | Hopff et al. | Dec. 5, 1939 |
| 2,218,439 | Rothrock | Oct. 15, 1940 |
| 2,273,891 | Pollack et al. | Feb. 24, 1942 |
| 2,298,039 | D'Alelio | Oct. 6, 1942 |
| 2,310,731 | D'Alelio | Feb. 9, 1943 |

OTHER REFERENCES

Shriner et al., Identification of Organic Compounds, 2d ed., John Wiley & Sons, N. Y. (1940), page 43.